Feb. 20, 1968   E. T. DAVIS   3,369,750
ELECTRICAL CONTROL NETWORK
Filed Sept. 3, 1965   3 Sheets-Sheet 1

Feb. 20, 1968 E. T. DAVIS 3,369,750
ELECTRICAL CONTROL NETWORK
Filed Sept. 3, 1965 3 Sheets-Sheet 2
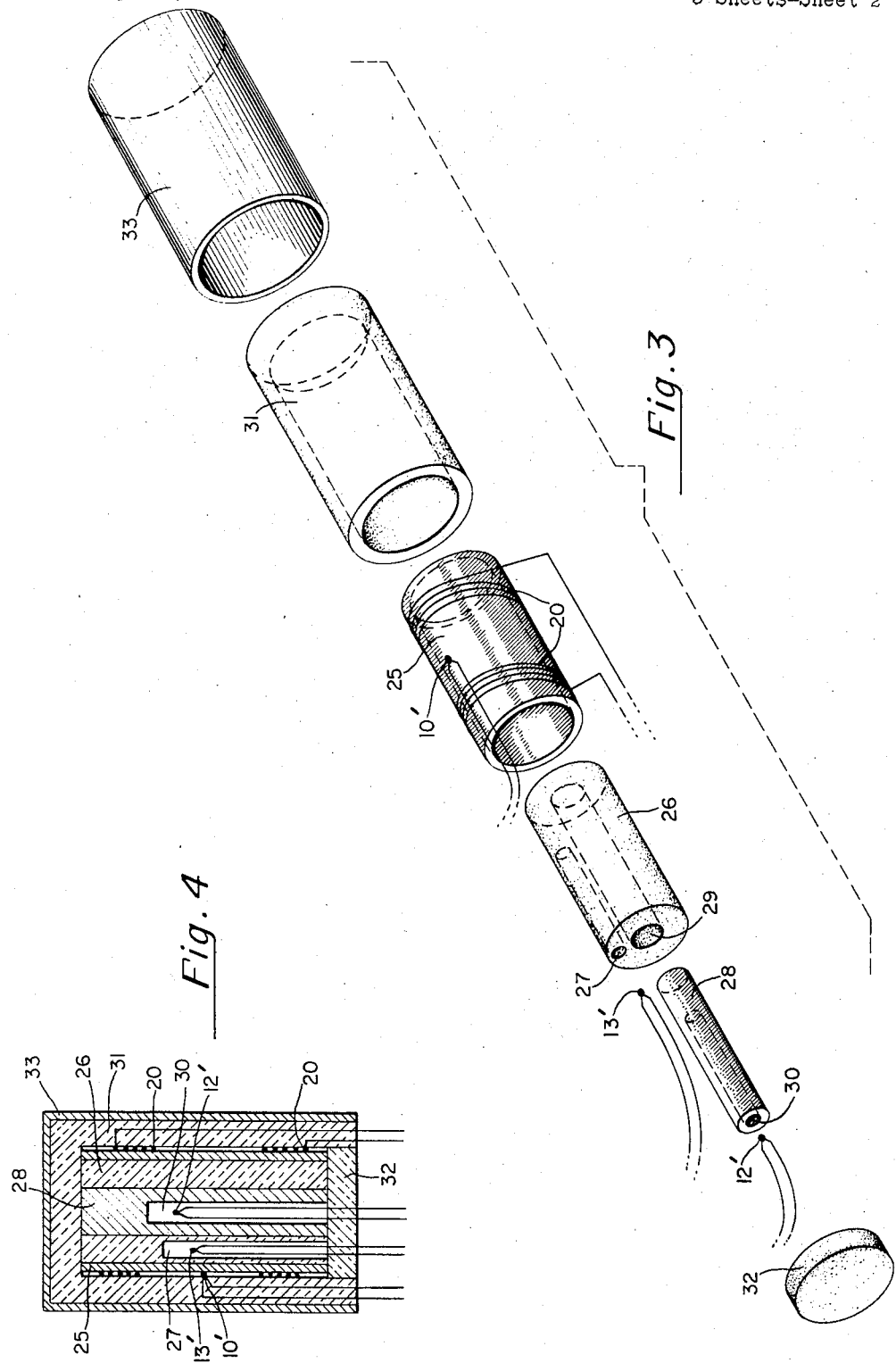

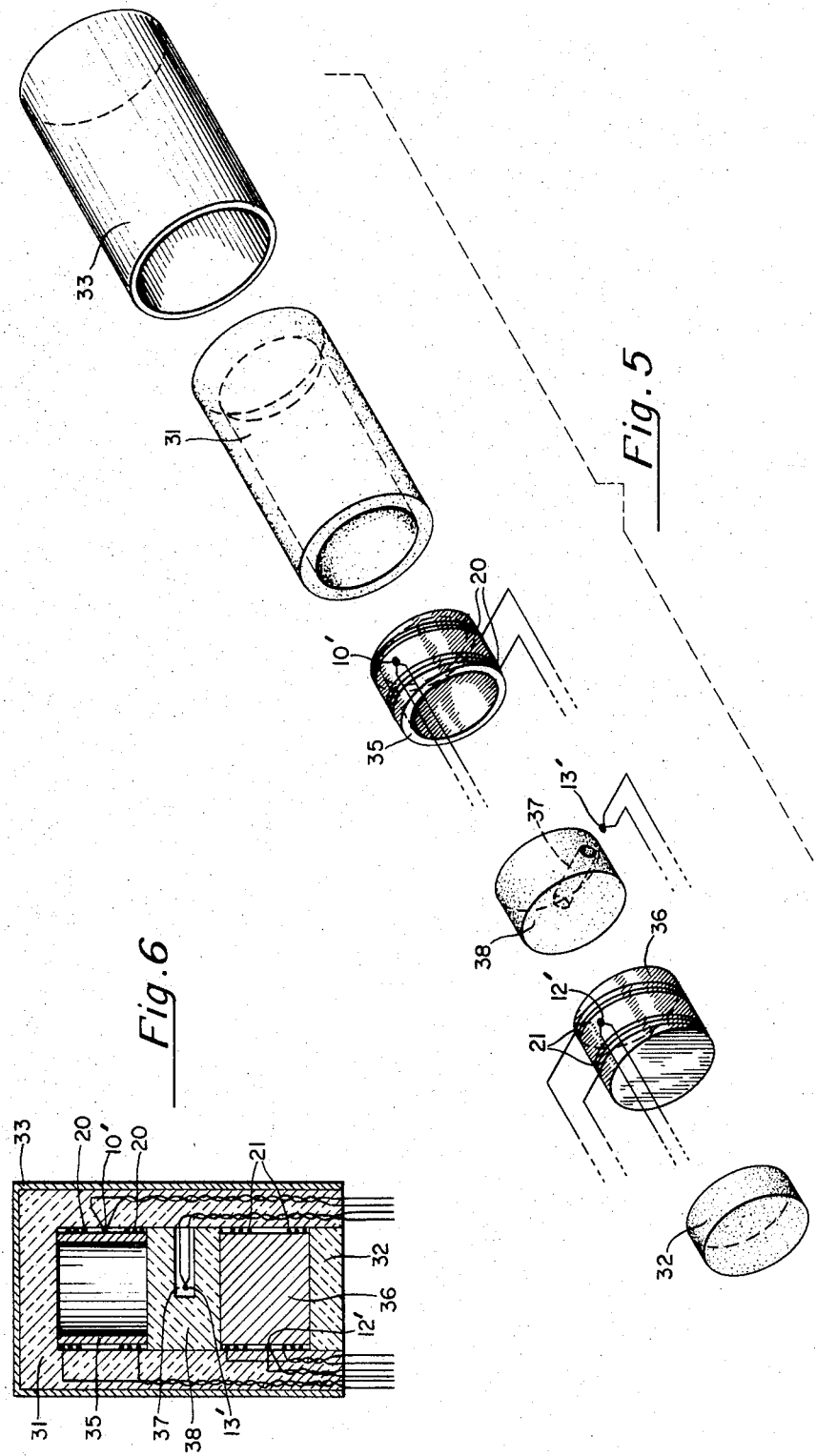

United States Patent Office 3,369,750
Patented Feb. 20, 1968

3,369,750
ELECTRICAL CONTROL NETWORK
Elwood T. Davis, Havertown, Pa., assignor to Leeds & Northrup Company, a corporation of Pennsylvania
Filed Sept. 3, 1965, Ser. No. 484,997
13 Claims. (Cl. 236—68)

ABSTRACT OF THE DISCLOSURE

An electrical control network and a thermal control unit utilized therein providing proportional, rate and reset actions. The control network includes a fast response rate and proportional action thermocouple connected in series aiding relationship with the process variable and in series opposition to a parallel circuit which includes intermediate and slow thermal response thermocouples which provide reset action wherein the rate, proportion, and reset action thermocouples are heated in accordance with the input to the process. The thermal control unit includes at least two temperature responsive devices of different thermal responses which are insulated one from another and from the ambient temperatures surrounding the unit.

Background of invention

Control systems presently in use which are capable of providing proportional, rate and reset control functions are generally complex in operation as well as costly and large in size.

Further, these control systems incorporate a large number of individual elements which affect the ease of assembly of the devices as well as the sensitivity and accuracy of the system.

Also, the elements presently used in thermal control devices of the type here being described require considerable input power during operation, which large input power further has the disadvantage of increasing the ambient temperature within the system itself.

Summary of invention

Accordingly, in one aspect of the invention, there is provided a simplified but accurate and effective thermal control network which provides proportional, rate and reset actions through the utilization of at least one temperature responsive device having a fast thermal response connected in series aiding relationship with the electrical output of a primary element responsive to the change of magnitude or condition of a process variable and further connected in series opposition with a parallel circuit formed by at least two temperature responsive devices, one of which has a relatively long thermal response, wherein the temperature responsive devices are controlled by heating elements associated therewith whose input is in accordance with or related to the input to the process.

In accordance with another aspect of the invention, a thermal control unit is provided which is capable of proportional, rate and reset actions wherein at least one temperature responsive device of relatively small thermal capacity and at least one other temperature responsive device of greater thermal capacity are enclosed within and insulated one from another by a suitable insulating medium together with heating means associated with the temperature responsive devices to thus provide a compact thermal control unit which requires little input power and which is relatively insensitive to surrounding ambient temperatures as well as a thermal control unit in which the temperature responsive devices will have an unequal thermal response for transient input to the heating means and an equal thermal response after a given period of time for a steady state input to the heating means.

In a specific embodiment, the temperature responsive devices may be thermally sensitive electronic elements such as thermocouples.

Other objects and advantages of the present invention will be pointed out in the following description thereof taken in conjunction with the drawings in which:

Description of drawings

FIG. 3 is an exploded isometric view of one embodiment of the thermal control unit of the present invention;

FIG. 4 is a cross-sectional view of the embodiment of FIG. 3 in assembled position.

FIG. 5 is an exploded isometric view of a further embodiment of the thermal control unit of the present invention; and FIG. 6 is a sectional view of the embodiment of FIG. 5 in assembled position.

Description of invention

Figure 1:
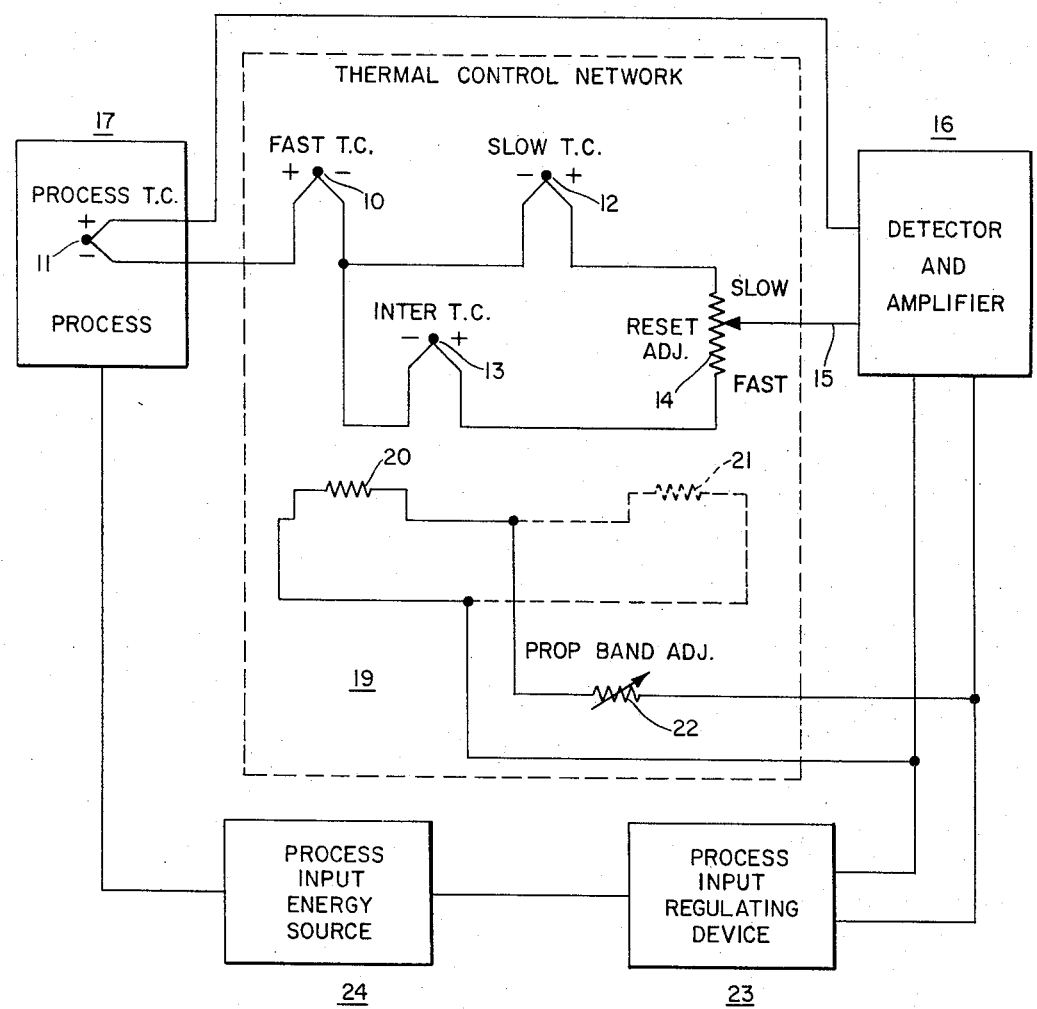
FIG. 1 is a schematic diagram showing in detail the thermal control network of the present invention in relation to an illustrative control system in which the network may be used.

Referring now to FIG. 1, the thermal control network of the present invention is shown enclosed by dashed lines and includes a proportional and rate action thermocouple unit 10 connected in series aiding relationship with a process thermocouple 11 or other primary element associated with the process which has an electrical output characteristic of the magnitude of the condition of the process variable being measured.

Connected in series opposition to the proportional and rate action thermocouple unit 10 is a parallel circuit which includes two reset action thermocouples 12 and 13, each of which has one terminal thereof connected across a voltage divider such as potentiometer 14. A suitable connection 15 is made from the ouptut of the potentiometer 14 to a detector and amplifier device 16.

In operation of the thermal control network, any deviation of the process from the control point will be reflected through the thermal control network and sensed by the detector and amplifier 16 which in turn will transmit a corresponding signal to the process input regulating device 23, whereupon the input to the process 17 from the process input energy source 24 will be regulated accordingly.

The detector and amplifier 16 together with the process input regulating device 23 and process input energy source 24 may provide a current adjusting type (CAT) or valve position adjusting type (PAT) or duration adjusting type (DAT) of control depending upon the choice of detector, regulating device and energy source. The current adjusting type of control may be used, for example, where it is desired to regulate an electro pneumatically operated valve. The position adjusting type of control may be used when, for example, the final control element is a valve which is positioned to regulate process input and a typical application of the duration adjusting type of control would be an adjustment of the percent "on" time of an on-off type heat input to an electric furnace.

A preferred form of detector is of the optical meter movement type which provides electrical isolation between the input signal to the detector and the process regulating equipment associated with the output thereof. By using a meter movement, excellent noise rejection is provided, both longitudinal and transverse at a relatively low cost.

The thermocouple units may consist of a thermocouple alone or a thermocouple associated with a thermal mass. By this means the thermal time constant of a given thermocouple unit can be selected depending upon the size, type of the thermocouple, whether or not a thermal mass is used in conjunction with the thermocouple and the relative position of the thermocouple in relation to the thermal feedback circuit 19 to be discussed later.

The thermal time constants of the three thermocouple units 10, 12 and 13 are by design different one from another, thermocouple unit 10 having the shortest time constant and thermocouple unit 12 having the longest with thermocouple unit 13 being one of intermediate thermal response.

A thermal feedback circuit 19 includes a heater 20 and, in an alternative embodiment of the network, a second heater 21 connected in parallel with the heater 20. The heater 20 or heaters 20 and 21 depending upon the embodiment concerned are associated in heat transfer relationship with the thermocouple units 10, 12 and 13 and are further connected across the input to the process input regulating device 23. Thus the input power to the heaters will be a function of the regulation of the input to the process 17.

The thermal control network is so designed that if there is no change in the process, there will be a steady state regulation of the input thereto and thermocouple units 10, 12 and 13 will, after a given period of time depending on the longest thermal time constant, reach the same temperature whereupon, if the thermocouples are of the same type, the output of the network will be reduced to zero.

Thus, it will be appreciated that if the process is changing, the regulation of the input to the process 17 and thermal feedback circuit 19 will be transient in nature and the output of the network will be other than zero owing to the different thermal time constants of the thermocouple units.

In CAT and PAT systems described above, the control of the process is accomplished on an uninterrupted basis by continuous modulation of the input to the process, such as by changing the amount of current input to the process heaters or the position of a valve to regulate fuel flow. Under these conditions thermocouple units 10, 12 and 13 tend to maintain a steady temperature when the process conditions are not changing, and to vary when process conditions are changing due to the changing input to the thermocouple units through the thermal feedback circuit 19. However, in DAT systems the control of the process is on an intermittent basis whereby the input power is either fully on or fully off with the percent "on" time determined by the average process input requirement to maintain the process at the control point. Therefore, since the thermal feedback to the heaters 20 and 21 is applied simultaneously with process input, the electrical output of thermocouple units 10, 12 and 13 will be cycling around an average value determined by the average heat input applied by the heaters. The magnitude of the cycle will, of course, depend on the thermal time constant of the particular thermocouple unit being considered. The process, however, will not generally be significantly affected by the cycling effect of the process input due to its great thermal inertia.

The proportional band of the thermal control network may be made adjustable by placing a variable resistance device 22 in series with the heaters 20 and 21.

The proportional control action present in the thermal control network of the present invention can be visualized by first presuming that the control network has reached an output average of zero due to a period of steady state input to the process. Now assume that a deviation of the process from control point has just occurred.

An error signal representative of the magnitude of the deviation is transmitted through the thermal control network to the detector and amplifier 16 whose balance and consequent input to the process input regulating device 23 will be correspondingly altered to correct the deviation.

The new signal to the process input regulating device 23 will concurrently affect the input power to the heaters 20 and 21 which in turn affects the temperature of the fast thermal response thermocouple unit 10 in a manner to restore balance. For the moment, the effect on the network of thermocouple units 12 and 13 can be disregarded due to their much slower thermal response.

The greater the deviation of the process from control point, the greater will be the corresponding temperature change required in thermocouple unit 10 to restore balance.

Further, the greater the temperature of thermocouple unit 10, the greater will be the heat loss per unit of time from the thermocouple unit due to the increased temperature differential between the unit and its surroundings.

Considering now a given departure of thermocouple unit 10 wherein the process has deviated below control point, it will be appreciated that the greater the deviation, the greater will be the temperature required of thermocouple unit 10 to restore balance and due to the greater heat loss from the unit at elevated temperatures the greater will be the heat input required to maintain this temperature.

Thus, the greater the heat input to thermocouple unit 10 required to maintain balance of the detector, the greater will be the extent of the change in the input to the process. Therefore, the input to the process will be proportional to the extent of the deviation of the process from the control point.

The control network of the present invention also includes rate action which provides an additional increment of regulation of the input to the process in proportion to the rate of deviation of the process from control point. This rate action is due to the inherent thermal inertia or heat storage in the proportional and rate action thermocouple unit 10 and its associated heater 20.

Under steady state conditions, the heat input to thermocouple unit 10 required to maintain detector balance will be a given amount as determined by the proportional action of the thermal control network.

Upon a deviation of the process at a given rate in a direction calling for additional input to the process, the temperature of thermocouple unit 10 must rise at a corresponding rate to maintain detector balance.

In order for thermocouple unit 10 to rise in temperature (at the rate of deviation) there must be an additional increment of heat input to the thermocouple unit beyond that required to merely hold the temperature of the thermocouple unit constant due to the inherent heat storage or thermal inertia of the unit.

Thermocouple unit 10, in requiring this additional increment of heat input in maintaining detector balance, will consequently cause an additional increase in the input to the process.

The greater the rate of deviation of the process from control point the greater must be the corresponding rate of temperature rise of thermocouple unit 10 to maintain detector balance, and consequently, the greater will be the additional increment of heat input to thermocouple unit 10 required to provide this greater rate of temperature rise.

The change in input to the process due to rate action is proportional to the additional increment of heat input which in turn is proportional to the rate of temperature rise of thermocouple unit 10. Further, the rate of temperature rise of thermocouple unit 10 is proportional to the rate of deviation of the process. Therefore, due to rate action, a change in input to the process beyond proportional action alone will occur which is proportional to the rate of deviation of the process.

The converse control action will occur when the process is deviating in a direction which requires a lesser input to the process.

While the rate action of thermocouple unit 10 of FIG. 1 has but a single value due to the given thermal inertia of thermocouple unit 10, it is to be understood that any given rate action could be obtained by selecting a thermocouple unit with the proper thermal inertia or by using two or more thermocouple units connected in parallel across a voltage divider through which any desired rate action may be selected within the limits set by the thermocouple units.

Further, thermocouple unit 10 may be replaced by two or more thermocouple units in series to increase the proportional band beyond that obtainable by a single thermocouple unit.

Figure 2:
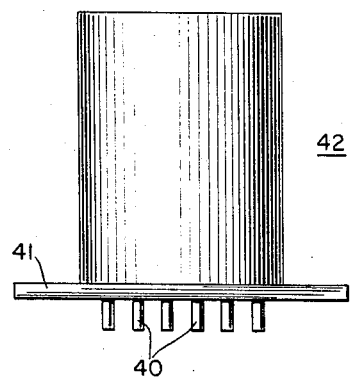
FIG. 2 is a side view of the thermal control unit of the present invention in enclosed and assembled position.

The thermal control network of FIG. 2 also provides automatic reset action which in effect, produces an automatic reset of the proportional band with respect to the set point of the detector so that the process input regulating device 23 will be properly adjusted to compensate for changes of load in the process and thus cause the process to return to the control point regardless of the load change.

To visualize reset action, the effect of the reset action thermocouple unit 12 on the thermal control network heretofore disregarded will now be considered. It is to be recalled that the thermocouple unit 12 has a long thermal time constant.

Now, let it be assumed that the temperature of thermocouple unit 12 corresponds to the temperature of thermocouple unit 10 as the latter is at a given level in a CAT or PAT system or fluctuating up and down in a DAT system thus maintaining the control action at a given process input level. Now consider the effect of a process load change which requires the process heat input to change from one input rate to some greater input in order to keep the process at the desired control point. As a process deviation occurs because of the assumed increased process load, the proportional action previously described operates to increase the input to the process, and thermocouple unit 10 will operate at a proportionally increased temperature. As the reset thermocouple unit 12 slowly rises in temperature because of the increased heat input being delivered to the heater 20 or heaters 20 and 21, depending on the embodiment concerned, the increased output of the thermocouple unit 12 acts to cancel a portion of that being produced by thermocouple unit 10 and hence the control system calls for a further increase in process input in order to maintain a differential temperature between thermocouple unit 10 and thermocouple unit 12 which will provide the necessary feedback signal to cause the detector to operate around the rebalance point of the control detector. The increased process input causes a further slow rise in temperature of thermocouple unit 12 causing a further increase in process input. Thus a greater and greater rate of heat input to the process is provided until ultimately the process comes back to the control point.

Reset action will be effective to either slowly increase the process input or to slowly decrease it whenever the process deviates in a way that requires a differential signal between the thermocouple units 10 and 12 to rebalance the detector.

A second reset action thermocouple unit 13 having a different thermal time constant than thermocouple unit 12 may be placed in parallel with thermocouple unit 12 across a suitable voltage divider such as potentiometer 14 whereby through adjustment of the voltage divider, any reset rate may be selected within the thermal responses of the two thermocouple units. Thermocouple unit 13, for the purposes of illustration, has been chosen as having a lesser thermal time constant than thermocouple unit 12. It is understood, of course, that for practical operation of the thermal control network, thermocouple unit 13 must have a thermal time constant somewhat greater than thermocouple unit 10.

The thermocouples 10', 12' and 13' (FIGS. 3–6) of thermocouple units 10, 12 and 13 and the heaters 20 and 21 of the foregoing thermal control network may be combined in a unique and novel thermal control unit.

One embodiment of the thermal control unit according to the present invention is shown in FIGS. 3 and 4.

The proportional and rate action thermocouple 10' is disposed on the circumference of a hollow cylindrical thermal mass 25 in good heat transfer relationship therewith. Heater 20 may likewise be disposed on the circumference of the thermal mass 25 and preferably the windings thereof are positioned toward either end of the thermal mass thus assuring a somewhat diminished thermal response from the thermocouple 10' which is preferably positioned at a central point on the thermal mass. It has been established by experimentation that these locations provide the most desirable thermal response relationships, i.e., so that thermocouple units 10, 12 and 13 will all attain the same steady state temperature.

A cylindrical insulating member 26 of outside diameter corresponding closely to the inside diameter of the thermal mass 25, is inserted within the hollow cylindrical thermal mass and a recess 27 within the cylindrical insulating member 26 is designed to accommodate thermocouple 13'.

A second thermal mass 28 of greater thermal capacity than the hollow cylindrical thermal mass 25, is disposed within a hollow center portion 29 of the cylindrical insulating member 26; and the thermocouple 12' is positioned within a corresponding recess 30 provided in the thermal mass 28.

The thermal masses and associated thermocouples, together with the cylindrical insulating member 26 and heater 20 are, after they are assembled, enclosed within an open ended cylindrical insulating cap 31 whose open end is further sealed by an insulating plug 32, all as shown in FIG. 4. The entire assembly is then enclosed in a metal container 33 to thus protect the assembly from external damage.

It will be readily appreciated that the thermocouple 10' will have a relatively fast thermal response as compared to the thermocouple 12' positioned within the greater thermal mass 28. Accordingly, the thermocouple 13' disposed intermediate the thermocouples 10' and 12' and within the cylindrical insulating member 26, will have a faster thermal response than thermocouple 12' and a slower thermal response than thermocouple 10'.

Since all of the thermocouples and associated thermal masses as well as heater 20 are completely enclosed by the insulating members 31 and 32, it will also be readily appreciated that while the thermocouples will have different thermal time constants resulting in different thermal responses for a transient input to the heater 20, the thermocouples will nevertheless for a steady state input to the heater 20, attain the same temperature after a given period of time.

The foregoing equality of all thermocouple temperatures which results following steady state input to the heater 20 can be obtained only if the heat transfer value of the medium between the heater and each of the three thermocouples 10', 12' and 13' and the value of the medium between each of the three thermocouples and ambient are so proportioned with respect to each other to create respective temperature gradients between the heater, the thermocouples and ambient such that the temperatures of the thermocouples are equal during steady state input to the heater. Calculation and experimentation are necessary to determine the requisite spacing, conductive paths and insulating paths between the heater, thermocouples and ambient to produce the necessary temperature gradients in these complex heat flow paths to and from all the thermocouples.

Due to the enclosure and insulation of the elements of the thermal control unit from ambient temperature, the heat losses from the three thermocouples to the ambient surroundings are not only reduced, but, as mentioned above, are properly proportioned to each other so that the equality of all thermocouple temperatures is unchanged under steady state conditions over a wide range of ambient temperature. Further, the input power required by the unit is substantially reduced as well as heat loss from the unit which results in undesirable temperature rises in the system in which the unit is employed.

Another embodiment of the thermal control unit, according to the present invention, is shown in FIGS. 5 and 6.

This embodiment differs from that of FIGS. 3 and 4 in that here two heaters 20 and 21 are utilized, the latter being shown in FIG. 1 in dashed lines and referred to earlier.

The thermocouple 10' is disposed on the surface of a hollow cylindrical thermal mass 35 while the thermocouple 12' is disposed on the circumference of a second thermal mass 36 of greater thermal capacity than the thermal mass 35.

The thermocouple 13' is disposed in a recess 37 in the side of an insulating spacing member 38.

In this embodiment of the thermal control unit, each of the thermal masses 35 and 36 has a heater winding 20 and 21 respectively disposed in heat transfer relationship on the circumference of the thermal mass in the manner described for the embodiment of FIGS. 3 and 4.

The two thermal masses 35 and 36 and associated thermocouples and the insulating spacer member 38 and its associated thermocouple are disposed adjacent one another along a common axis with the insulating spacing member 38 positioned between the two thermal masses.

The thermal masses, thermocouples, insulating spacing member, and heaters are, as the thermal control unit of FIGS. 3 and 4, assembled into an insulating cap 31 and sealed by an insulating plug 32 as shown in FIG. 6 and as thus assembled, will function in the same manner as the thermal control unit of FIGS. 3 and 4.

The insulating material used in either embodiment heretofore discussed may be of any suitable insulating material, preferably polystyrene foam or cork.

Further, the thermal masses utilized in either embodiment may be made of any number of different materials depending upon the thermal time constant desired, although a metallic material such as brass, copper, steel or aluminum is preferred.

After the thermal control units of either embodiment have been assembled as shown in FIGS. 4 and 6, the leads from the thermocouples and heaters may, as shown in FIG. 2, be terminated at selected terminals 40 secured to a terminal board 41 to thus provide a compact control unit 40 which may be of the plug-in type capable of easy insertion into and removal from a control system or of the semi-permanent type wherein the terminals 40 are solder connected to the remaining components of the system.

While preferred embodiments of the invention have been described, it is to be understood that further modifications may be made within the scope of the dependent claims.

What is claimed is:
1. In a system for controlling the magnitude or condition of a process variable including a primary element having an electrical output responsive to the process, a process input regulating device, and a detector and amplifier for controlling said input regulating device; a thermal control network providing proportional, rate and reset actions comprising:
 a variable voltage divider;
 a first reset action themocouple unit having a relatively slow thermal response;
 a second reset action thermocouple unit having a relatively intermediate thermal response connected in parallel with said first reset action thermocouple unit across said variable voltage divider for varying said reset action;
 an output connection from said variable voltage divider to said detector;
 at least one proportional and rate action thermocouple unit having a relatively fast thermal response connected in series aiding relationship with said primary element and in series opposition with the parallel circuit formed by said intermediate and said slow response reset action thermocouple units; and
 heater means controlled in accordance with the input to said process for heating said proportional and rate action thermocouple unit and said first and second reset action thermocouple units whereby upon a deviation of the process variable, the relatively fast thermal response of said proportional and rate action thermocouple unit will provide proportional and rate action responses within the control network and the slower response characteristics of the first and second reset action thermocouple units will, through their opposing voltage, provide a reset characteristic within the control network.

2. The thermal control network of claim 1 further including variable resistance means in series with said heater means for varying the proportional action of said control network.

3. The thermal control network of claim 1 further including insulation means for insulating said first reset action thermocouple unit, said second reset action thermocouple unit and said proportional and rate action thermocouple unit one from another and from ambient temperatures adjacent the control network.

4. The thermal control network of claim 1 wherein said first and second reset action thermocouple units and said proportional and rate action thermocouple unit include the same type of thermocouples and further including insulation means completely encompassing said thermocouple units whereby under steady conditions said thermocouple units will attain the same maximum temperature thereby reducing the network output to zero.

5. The thermal control network of claim 1 wherein said heater means comprises a single heating element disposed in more direct heat transfer relationship with said proportional and rate action thermocouple unit and in less direct heat transfer relationship with said first and said second reset action thermocouple units.

6. The thermal control network of claim 1 wherein said heater means comprises a first heater element and a second heater element connected in parallel and wherein said first heater element is disposed in direct heat transfer relationship with said proportional and rate action thermocouple unit and said second heater element is disposed in direct heat transfer relationship with said first reset acton thermocouple unit.

7. In a system for controlling the magnitude of a condition of a process variable including a primary element having an electrical output responsive to the process, a process input regulating device, and a detector and amplifier for controlling said input regulating device; a thermal control network providing proportional, rate and reset action comprising:
 a variable voltage divider;
 a second thermal mass of relatively great thermal capacity;
 a first reset action thermocouple disposed in heat transfer relationship with said second thermal mass;
 a second reset action thermocouple connected in parallel with said first reset action thermocouple across said variable voltage divider for varying said reset action;
 an output connected from said variable voltage divider to said detector and amplifier;
 a first thermal mass of relatively small thermal capacity;

a proportional and rate action thermocouple disposed in heat transfer relationship with said first thermal mass and connected in series aiding relationship with said primary element and in series opposition with the parallel circuit formed by said first and said second reset action thermocouples;

insulation means for insulating said first reset action thermocouple and associated thermal mass, said second reset action thermocouple, and said proportional and reset action thermocouple and associated thermal mass one from another and from ambient temperatures adjacent the thermal control network; and heater means controlled in accordance with the input to said process for heating said proportional and rate action thermocouple and said first and second reset action thermocouples whereby upon a change in said process, the relatively fast thermal response of said proportional and rate action thermocouple will provide proportional and rate actions within the control network and the slower response characteristics of the first and second reset action thermocouples will through their opposing voltage, provide a reset characteristic within the control network and upon no change in said process, said proportional and rate action thermocouple and said first and second reset action thermocouples will reach an equilibrium temperature thereby providing an average total thermal response of zero.

8. A thermal control unit having proportional, rate and reset actions for utilization in a control system for controlling a process variable including the components of:

a first thermal mass of relatively small thermal capacity, a first thermally sensitive electronic element in thermal contact with said first thermal mass, a second thermal mass of relatively great thermal capacity, a second thermally sensitive electronic element disposed in thermal contact with said second thermal mass, heater means disposed in thermal contact with said first thermal mass at a point spaced from said first electronic element, insulation means for insulating said first electronic element and associated thermal mass and said second electronic element and associated thermal mass one from another and from ambient temperatures and for supporting and maintaining said components in a self contained composite and unitary control unit, and the spacing between said heater means and said first electronic element and the value of said insulation means being so proportioned to create relative temperature gradients between said heater means, said first and second electronic elements and ambient such that the thermal conditions of said first and said second electronic elements equal one another during steady state input to said heater means and differ one from another during a transient input to said heater means.

9. A thermal control unit having proportional, rate and reset actions for utilization in a control system for controlling a process variable comprising:

a first thermal mass of relatively small thermal capacity;

a first thermocouple disposed in heat transfer relationship with said first thermal mass;

a second thermal mass of relatively great thermal capacity;

a second thermocouple disposed in heat transfer relationship with said second thermal mass;

a third thermocouple disposed intermediate said first thermocouple and said second thermocouple;

insulation means for insulating said first thermocouple and associated thermal mass, said second thermocouple and associated thermal mass and said third thermocouple one from another and from ambient temperatures adjacent the thermal control unit; and heater means disposed within said insulation means and in selected proximity to said thermocouples and said thermal masses whereby the thermal time constants of said thermocouples will differ one from another so that the thermal conditions of said thermocouples will differ one from another during a transient input to said heater means and equal one another during a steady state input to said heater means.

10. The thermal control unit of claim 9 wherein the heater means includes a heater winding around said first thermal mass, wherein said second thermal mass is disposed concentric within said first thermal mass and wherein said third thermocouple is supported within said insulation means intermediate said first and said second thermal masses whereby said third thermocouple will have a thermal response intermediate that of said first and second thermocouples to provide said thermal control unit with a selective reset action output.

11. A thermal control unit having proportional, rate and reset actions for utilization in a control system for controlling a process variable comprising:

a hollow thermal mass of relatively small thermal capacity;

heater windings disposed upon the outer circumference of said hollow thermal mass;

a first thermocouple disposed in heat transfer relationship with said hollow thermal mass;

an insulating member disposed within said hollow thermal mass;

a second thermal mass of relatively great thermal capacity disposed within said insulating member;

a second thermocouple disposed within a recess in said second thermal mass;

a third thermocouple disposed within said insulating member intermediate said second thermal mass and said hollow thermal mass; and insulation means for insulating said first thermocouple and associate thermal mass, said second thermocouple and associate thermal mass and said third thermocouple one from another and from ambient temperatures adjacent the thermal control unit whereby the thermal time constants of said thermocouples will differ one from another and cause the thermal conditions of said thermocouples to differ one from another during a transient input to said heater windings and to equal one another during a steady state input to said heater windings.

12. The thermal control unit of claim 9 wherein said heater means include a first heater winding disposed on said first thermal mass, a second heater winding disposed on said second thermal mass and wherein said third thermocouple is supported within said insulation means intermediate said first and said second thermal masses whereby said third thermocouple will have a thermal time constant intermediate that of said first and second thermocouples to provide said thermal control unit with a selective reset action output.

13. A thermal control unit having proportional rate and reset actions for utilization in a control system for controlling a process variable comprising:

a first thermal mass of relatively small thermal capacity;

a first heater winding disposed upon the outer circumference of said first thermal mass;

a first thermocouple disposed in heat transfer relationship with said first thermal mass;

a second thermal mass of relatively great thermal capacity disposed adjacent said first thermal mass;

a second heater winding disposed upon the outer circumference of said second thermal mass;
a second thermocouple disposed in heat transfer relationship with said second thermal mass;
first insulation means disposed intermediate said first thermal mass and said second thermal mass;
a third thermocouple disposed within said first insulation means; and
second insulation means for insulating said first thermocouple and associated thermal mass, said second thermocouple and associated thermal mass and said third thermocouple one from another and from ambient temperatures adjacent the thermal control unit whereby the thermal time constants of said thermocouples will differ one from another so that the thermal conditions of said thermocouples will differ one from another during a transient input to said first and second heater windings and equal one another during a steady state input to said first and second heater windings.

References Cited

UNITED STATES PATENTS

| | | | |
|---|---|---|---|
| 2,148,491 | 2/1939 | Moore | 236—68 |
| 2,620,136 | 12/1952 | Levine | 236—78 |
| 2,666,889 | 1/1954 | Ehret et al. | |
| 3,071,520 | 1/1963 | Smalling | 73—204 X |
| 3,075,130 | 1/1963 | Bolmgren | 236—68 |

ROBERT A. O'LEARY, *Primary Examiner.*

W. E. WAYNER, *Assistant Examiner.*